J. P. SINCLAIR.
Chair Seats.
No. 141,295.
Patented July 29, 1873.
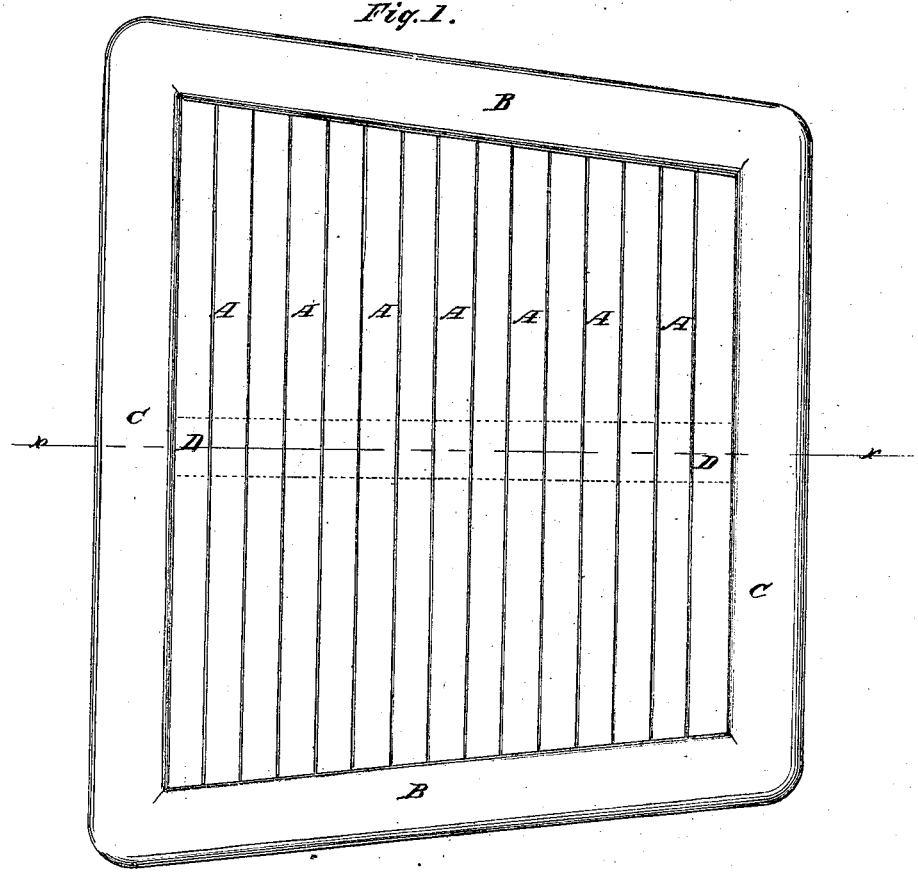
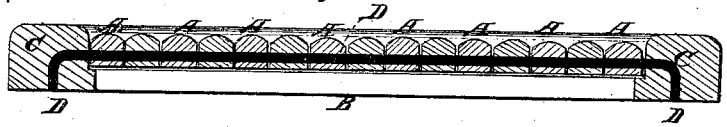
Witnesses:
P. C. Dieterich
C. Sedgwick
Inventor:
J. P. Sinclair
PER
Attorneys.

UNITED STATES PATENT OFFICE.

JAMES P. SINCLAIR, OF ELBRIDGE, NEW YORK.

IMPROVEMENT IN CHAIR-SEATS.

Specification forming part of Letters Patent No. 141,295, dated July 29, 1873; application filed January 25, 1873.

*To all whom it may concern:*

Be it known that I, JAMES P. SINCLAIR, of Elbridge, in the county of Onondaga and State of New York, have invented a new and useful Improvement in Chair-Seats, &c., of which the following is a specification:

Figure 1 is a top view of my improved chair-seat. Fig. 2 is a detail section of the same, taken through the line $x\ x$, Fig. 1.

Similar letters of reference indicate corresponding parts.

My invention relates to an improved mode of forming seats or backs for chairs or other similar articles. The invention consists in the combination of the strips, the bars of the frame grooved upon their inner edges, and the metallic strips, one or more passing transversely through the strips, and secured to the bars of the frame with each other, as hereinafter fully described.

A are strips of wood or other suitable material, which are placed edge to edge, and the ends of which enter grooves in the inner edges of the side bars B of the frame B C. The forward edge of the forward strip A and the rear edge of the rear strip A enter grooves in the inner edges of the front and rear bars C of the frame B C. The adjacent ends of the bars of the frame B C are framed and secured to each other in the ordinary manner. D is a strip of galvanized iron, which may be made flat, or may be a wire, and which is passed through holes in the strips A, and its ends enter and are secured in holes in the front and rear bars of the frame B C. One or more of the metal strips D may be used, as may be required. The particular form of the frame B C must depend upon the form of the seat of back for which the device is to be used.

Having thus described my invention, I claim as new and desire to secure by Letters Patent—

The combination of the strips A, the bars of the frame B C, grooved upon their inner edges, and the metallic strips D, one or more passing transversely through the strips A and secured to the bars of the frame B C, with each other, substantially as herein shown and described.

JAMES P. SINCLAIR.

Witnesses:
 HARVEY M. COLE,
 BURDETT B. LEE.